July 8, 1958
O. M. WHITTEN
2,842,332
VALVE CONSTRUCTION
Filed Feb. 25, 1954
2 Sheets-Sheet 1
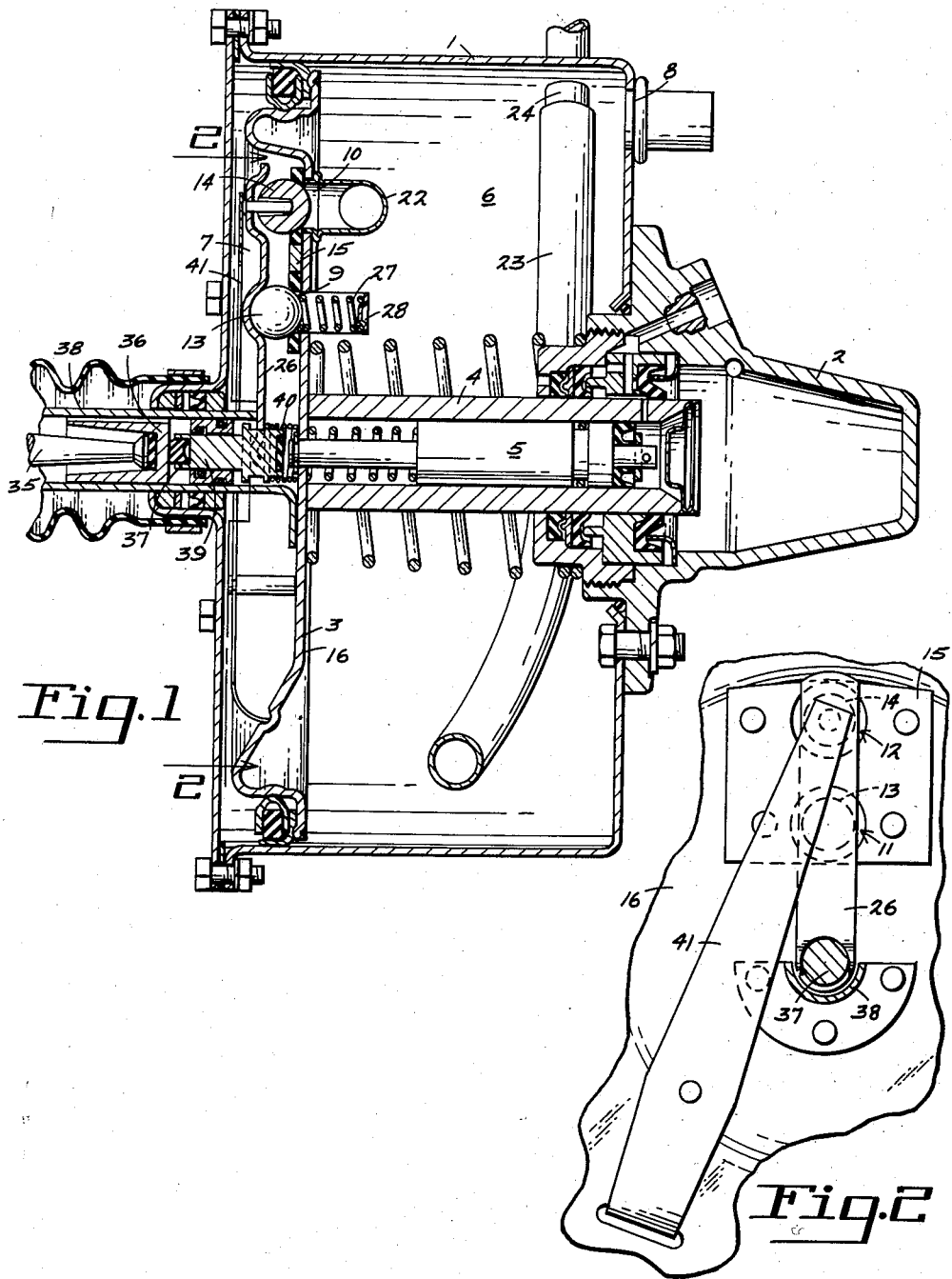
INVENTOR.
OWEN M. WHITTEN.

INVENTOR.
OWEN M. WHITTEN.

United States Patent Office 2,842,332
Patented July 8, 1958

2,842,332

VALVE CONSTRUCTION

Owen M. Whitten, Detroit, Mich., assignor to Kelsey-Hayes Company, a corporation of Delaware Application February 25, 1954, Serial No. 412,537

2 Claims. (Cl. 251—86)

The invention relates to valve constructions and refers more particularly to valve constructions for use in booster devices.

The invention has for one of its objects to provide an improved valve construction having a valve which is rotatable or adapted to roll over its seat both into and out of sealing engagement with the seat so that the seat is not scuffed and effective life of the valve construction is increased.

The invention has for another object to provide a valve construction having a valve rotatably engaging its mounting so that the mounting opposes no resistance to the rotation of the valve when rotating over the seat.

These and other objects of the invention will become apparent from the following description taken in connection with the accompanying drawings in which:

Figure 1 is a sectional view of a booster device employing a valve construction embodying the invention;

Figure 2 is a rear elevation of the valve seat construction;

Figures 3, 4:
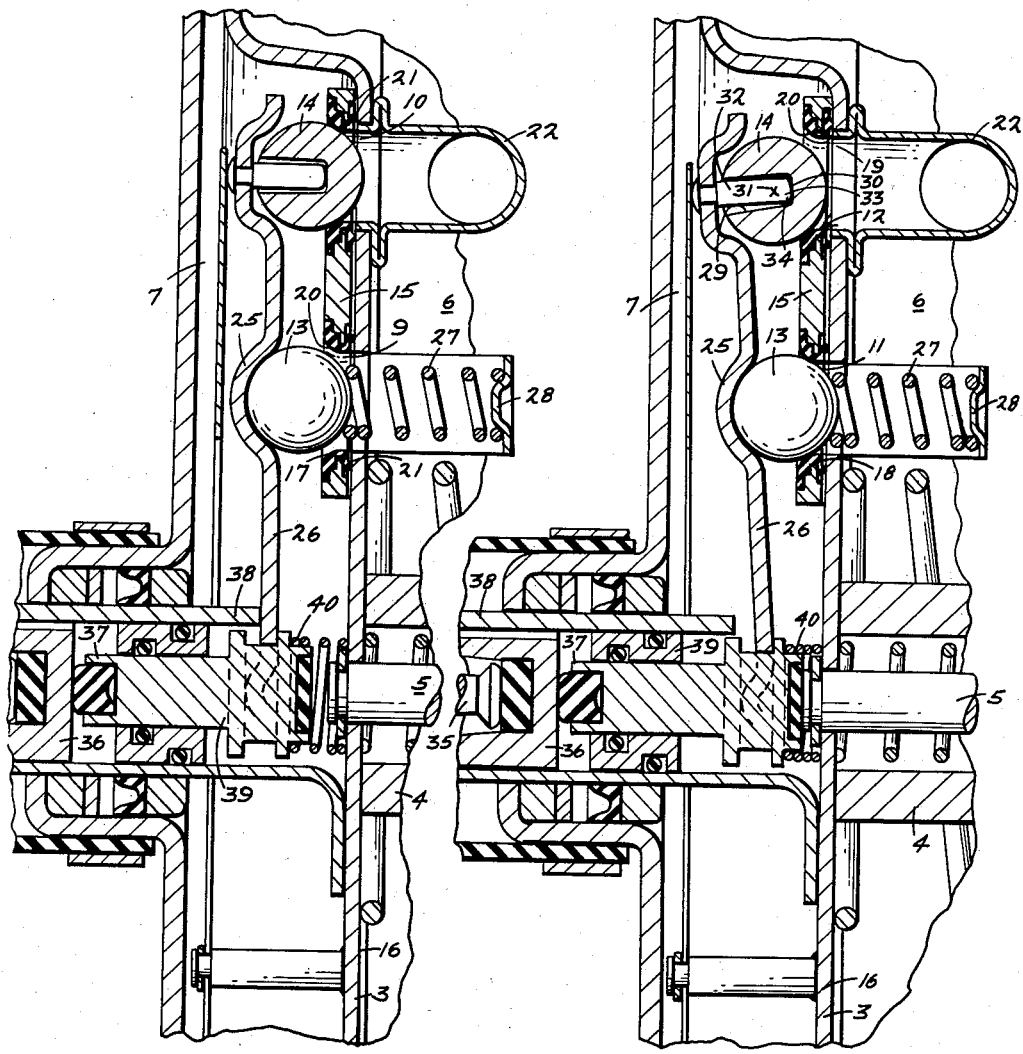
Figures 3 and 4 are enlarged views of a portion of Figure 1 showing the valves in different positions.

The valve construction is designed particularly for use in booster devices for applying hydraulic brakes of motor vehicles. As shown in Figure 1 the booster device has the housing 1, the hydraulic cylinder 2 mounted on the front end of the housing, the power piston 3 reciprocable within the housing, the outer power plunger 4 secured to the power piston and extending forwardly within the cylinder 2 and the inner reaction plunger 5 slidable within the power plunger and having its forward end subject to the pressure of the braking liquid within the cylinder 2. The power piston divides the space within the housing 1 into the chambers 6 and 7. The chamber 6 is in front of the power piston and communicates through the port 8 with a suitable source of vacuum such as the intake manifold of an internal combustion engine. The chamber 7 is in rear of the power piston and is adapted to communicate either with the chamber 6 or with the atmospheric air through the passages 9 and 10 respectively in the power piston.

The valve construction for controlling the operation of the booster device comprises the seats 11 and 12 forming the rear ends of the passages 9 and 10 respectively and the vacuum valve 13 and air valve 14 movable into sealing engagement with the seats 11 and 12 respectively. The seats 11 and 12 are rubber inserts bonded to the sheet metal plate 15 which is fixedly secured as by rivets to the rear side of the sheet metal disk 16 of the power piston 3. The disk is provided with holes forming the front ends of the passages 9 and 10. Each rubber insert extends through a hole in the plate 15 and has the portion 17 at the rear side of the plate, the portion 18 at the front side of the plate and the intermediate tubular portion 19 extending through the plate.

The rear portion has the arcuate valve bearing surface 20 and the front portion has the concentric forwardly extending annular rib 21 which forms an air seal between the disk 16 and the plate 15. The passage 9 communicates directly with the chamber in front of the power piston and the passage 10 communicates indirectly with the atmospheric air by means of the elbow 22 secured to the front face of the disk 16 and the flexible tube 23 connected at one end to the elbow and at the other end to the nipple 24 which extends through the housing 1 and communicates with the atmospheric air preferably through a filter.

The vacuum valve 13 is a metal ball of greater diameter than the portion of the seat bearing surface 20 with which it has sealing engagement and the rear portion of the balls fits the concave portion 25 of the lever 26 forming part of the valve actuating mechanism. The vacuum valve as shown is normally urged away from its seat by the coil spring 27 between the vacuum valve and the bottom of the yoke 28 which is fixedly secured to the front side of the disk 16. The air valve 14 is also a metal ball of greater diameter than the portion of the seat bearing surface 20 with which it has sealing engagement. For the purpose of avoiding scuffing of the seat 12 by the air valve when moving into or out of sealing engagement with the seat, the air valve is mounted to rotate or roll over the bearing surface 20 of the seat. Also for the purpose of imposing no resistance to the movement of the air valve relative to the mounting for the air valve, the air valve and mounting are constructed so that the air valve rotates or rolls over the mounting. In detail, the ball forming the air valve has the recess 29 extending at right angles to the partly spherical surface of the ball for sealing engagement with the seat. The recess opens toward the lever 26 and tapers from its open end to its bottom 30 which is located beyond the center of gravity 31 of the ball and between the center of gravity and the seat engaging surface. The mounting upon the lever is formed of the shouldered cylindrical pin 32 which extends freely or loosely into the recess 29 and engages the bottom 30 and holds the ball spaced from the lever. The free end of the mounting pin has the center spherical zone 33 of one radius and the corner spherical zone 34 of a smaller radius, the arrangement being such that the ball is rotatable or adapted to roll over the mounting pin when rolling over the seat, the relative positions being shown in Figures 2 and 3.

The valve actuating mechanism comprises in addition to the lever 26, the push rod 35, the slide 36 and the plunger 37. The push rod is connected to a manually operable element such as a foot pedal and the slide abuts the push rod and is reciprocable within the tubular member 38 which is secured to and extends rearwardly from the disk 16 of the power piston 3 through the rear end of the housing 1. The plunger 37 abuts the slide 36 and the lever 26 at opposite ends of the bearing 39 for the plunger, the bearing being fixed in the tubular member. For moving the plunger 37 rearwardly there is the control spring 40 and for closing the air valve there is the leaf spring 41. During operation of the booster device the plunger 37 is engageable by the reaction plunger 5 to transmit the pressure in the hydraulic cylinder 2 to the operator through the push rod. A more complete description of the booster device and its operation is presented in my co-pending application Serial No. 412,536 filed February 25, 1954, now Patent No. 2,812,639.

From the above description, it will be seen that I have provided a valve construction having a valve adapted to roll over its seat when being moved into or out of sealing engagement with the seat. Also that I have provided

What I claim as my invention is:

1. A valve construction comprising an annular seat, a valve having a partly spherical surface at one side thereof adapted to roll into and out of sealing engagement with said annular seat while partially entering the latter, said valve having an elongated recess in the side thereof opposite said partly spherical surface the axis of which extends through the center of gravity of said valve and through the center of said partly spherical surface, said bottom of said recess being located between the center of gravity of said valve and said partly spherical surface, and a mounting for said valve including a pin having an elongated body generally aligned with the axis of said seat and movable toward and away from said seat, said body extending freely into said recess and having an end rotatably engaging the bottom of said recess, said recess loosely receiving said body to enable said valve to move angularly relative to said body and to roll over an edge of said seat without interference from said body into full sealing engagement with said annular seat while partially entering the latter by the force of said end of said body against the bottom of said recess during movement of said pin toward said seat.

2. A valve construction comprising a seat having an annular internal convex bearing surface, a ball valve having a partly spherical surface at one side thereof adapted to roll into and out of sealing engagement with said annular bearing surface while partially entering the latter, said valve having an elongated recess in the side thereof opposite said partly spherical surface the axis of which extends through the center of gravity of said valve and through the center of said partly spherical surface, said recess tapering toward its bottom, said bottom of said recess being located between the center of gravity of said valve and said partly spherical surface, and a mounting for said valve including a pin having an elongated cylindrical body generally aligned with the axis of said bearing surface and angularly movable toward and away from said seat, said body extending freely into said recess and having a convex end rotatably engaging the bottom of said recess, the side wall of said recess at the bottom thereof closely confining said convex end of said body and the remainder of said side wall loosely encircling said body by reason of the tapering nature of said recess to enable said valve to move angularly relative to said body and to roll over an edge of said bearing surface without interference from said body into full sealing engagement with said annular convex bearing surface while partially entering the latter by the force of said convex end of said body against the bottom of said recess during the angular movement of said pin toward said seat.

References Cited in the file of this patent

UNITED STATES PATENTS

| 382,655 | Montgomery | May 8, 1888 |
| 1,062,138 | Baylis | May 20, 1913 |
| 1,171,189 | Grandi | Feb. 8, 1916 |
| 1,805,064 | Yarnall | May 12, 1931 |
| 2,024,548 | Struve | Dec. 17, 1935 |
| 2,143,655 | Heller | Jan. 10, 1939 |
| 2,257,199 | Sloan | Sept. 30, 1941 |
| 2,581,043 | Owens | Jan. 1, 1952 |
| 2,650,059 | Hjulian | Aug. 25, 1953 |

FOREIGN PATENTS

| 374,251 | France | 1907 |